US007788635B2

(12) United States Patent
Heirich

(10) Patent No.: US 7,788,635 B2
(45) Date of Patent: Aug. 31, 2010

(54) TECHNIQUE FOR PROCESSING A COMPUTER PROGRAM

(75) Inventor: Alan B. Heirich, Half Moon Bay, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1016 days.

(21) Appl. No.: 11/487,532

(22) Filed: Jul. 14, 2006

(65) Prior Publication Data
US 2007/0022424 A1 Jan. 25, 2007

Related U.S. Application Data

(60) Provisional application No. 60/699,557, filed on Jul. 15, 2005, provisional application No. 60/703,664, filed on Jul. 29, 2005.

(51) Int. Cl.
*G06F 9/44* (2006.01)
*G06F 17/50* (2006.01)
(52) U.S. Cl. ................ 717/104; 717/105; 717/153; 717/144; 717/151; 705/7; 705/8; 705/11
(58) Field of Classification Search .............. 717/104, 717/105, 144
See application file for complete search history.

(56) References Cited
U.S. PATENT DOCUMENTS

| 5,467,459 | A | 11/1995 | Alexander et al. |
| 5,870,097 | A | 2/1999 | Snyder et al. |
| 6,385,621 | B1* | 5/2002 | Frisina ............... 707/104.1 |
| 6,519,763 | B1* | 2/2003 | Kaufer et al. ............ 717/101 |
| 6,980,216 | B2 | 12/2005 | Hancock et al. |
| 7,562,338 | B2* | 7/2009 | Knutson et al. ........ 717/101 |
| 7,589,719 | B2* | 9/2009 | Owens et al. ............ 345/419 |
| 2004/0243968 | A1* | 12/2004 | Hecksel ................ 717/100 |
| 2005/0028133 | A1* | 2/2005 | Ananth et al. ............ 717/105 |
| 2005/0166178 | A1* | 7/2005 | Masticola et al. ........ 717/104 |
| 2006/0038811 | A1 | 2/2006 | Owens et al. |

OTHER PUBLICATIONS

Christoph W. Kessler, "Scheduling expression DAG's for minimal register need", *ComputerLanguages* Elsevier UK, vol. 24 No. 1, Apr. 1998, p. 33-53.

Bernhard Wess, "Optimizing signal flow graph compilers for digital signal processors", *Proceedings of the 5th International Conference on Signal Processing Applications and Technology DSP Associates* Waltham, MA, USA, vol. 1, 1994, p. 665-670.

Steven R. Vegdhal, "A Dynamic-Programming Technique for Compacting Loops", *Microarchitecture*, 1992. Micro 25., Proceedings of the 25th Annual International Symposium on Portland, OR, USA Dec. 1-4, 1992, Los Alamitos, CA, USA, IEE Comput. Soc, US, Dec. 1, 1992, p. 180-188.

(Continued)

*Primary Examiner*—Thomas K Pham
(74) *Attorney, Agent, or Firm*—Martine Penilla & Gencarella LLP

(57) ABSTRACT

The present invention is directed to a method for processing, in a computer system, a computer program having a plurality of operations. The method features calling a dynamic programming routine to generate a schedule for executing a subgroup of the plurality of operations by modeling operations of a computational processor associated with the computer system to minimize a computational cost of placing the computer system in a final machine state (finMS).

20 Claims, 6 Drawing Sheets

OTHER PUBLICATIONS

Andrew Riffel, Aaron E. Lefohn, Kiril Vindimce, Mark Leone and John D. Owens, "Mio: Fast Multipass Partitioning via Priority-Based Instruction Scheduling", *Proceedings of the ACM Siggraph/Eurographics Graphic Hardware 2004 Workshop*, Aug. 29, 2004, p. 35-44.

Mark S. Peercy, Marc Olano, John Airey; P. Jeffrey Ungar, "Interactive Multi-Pass Programmable Shading", *Computer Graphics. Siggraph 200 Conference Proceedings*. New Orleans, LA, Jul. 23-28, 2000,*Computer Graphics Proceedings. Siggraph*, New York, NY; ACM, US, Jul. 23, 2000, p. 425-432.

International Search Report for International Application PCT/US2006/027361 Date of Mailing Jan. 26, 2007.

Written Opinion of the International Search Authority for International Application PCT/US2006/027361 Date of Mailing Jan. 26, 2007.

"Eurographics/SIGGRAPH Graphics Hardware 2005 papers on the web", http://www.cs.brown.edu/~tor/gh2005-changelog.html.

Heirich, Alan, "Optimal Automatic Multi-pass Shader Partitioning by Dynamic Programming", Graphics Hardware, 2005.

* cited by examiner

TECHNIQUE FOR PROCESSING A COMPUTER PROGRAM

CLAIM OF PRIORITY

The present patent application claims priority to U.S. provisional patent application no. 60/699,557 filed Jul. 15, 2005, entitled OPTICAL AUTOMATIC MULTI-PASS SHADER PARTITIONING BY DYNAMIC PROGRAMMING and listing Alan B. Heirich as inventor and United States provisional patent application No. 60/703,664 filed Jul. 29, 2005 entitled MULTI-PASS SHADER PARTITIONING and listing Alan B. Heirich as inventor. Both of the aforementioned provisional patent applications are incorporated by reference herein, in their entirety.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Exemplary gaming platforms include the SONY PLAYSTATION 3™ or SONY PLAYSTATION 2™ each of which is sold in the form of a game console. As is well known, the game console is designed to connect to a monitor (usually a television) and enable user interaction through handheld controllers. The game console is designed with specialized processing hardware, including a graphics processing unit (GPU) for processing intensive graphics operations, a vector unit for performing geometry transformations, and other glue hardware, firmware, and software.

As the complexity of programmable shaders increases, their demand for graphical processor unit resources also increases. Complex shaders may consume more registers and other hardware resources than are physically available in the graphics processing unit (GPU) leading to a situation where the shader cannot be compiled for the target architecture. This situation may be resolved by virtualizing the GPU resources in time by partitioning the shader execution into passes that use the same resources for different purposes at different times. This virtualization process is known as shader partitioning and for best results occurs during the code generation phase of a shading language compiler. Previous attempts to partition the shader programs have resulted in non-optimal partitioning. Additionally, previous solutions do not scale efficiently for the applications to which a shader program is applied.

In view of the foregoing, there is a need for improved techniques that enable complex programs to run more efficiently on computer systems.

SUMMARY OF THE INVENTION

The present invention is directed to a method for processing, in a computer system, a computer program having a plurality of operations. The method features calling a dynamic programming routine to generate a schedule for executing a subgroup of the plurality of operations by modeling operations of a computational processor associated with the computer system to minimize a computational cost of placing the computer system in a final machine state (finMS). Specifically, the method generates a directed graph having precedence relations associated therewith representing the relationship among the plurality of operations. The dynamic programming routine generates a schedule for executing a subgroup of the plurality of operations to place the computer system in the finMS, in accordance with the precedence relations. As a result, a plurality of paths are generated, each of which represents a sequence of machine states in which the computer system may be placed to reach the finMS. A computational cost is associated with each of the machine states of the sequence. The path having the desired computational cost associated therewith may be selected to facilitate placing the computer system in the finMS, typically the lowest computational cost.

The present method was realized by taking advantage of dynamic programming. Employing dynamic programming allowed selecting paths in which the aggregate computational cost would be the lowest, even though individually selected operation might not appear to yield the lower computation cost. The results from the dynamic programming routine facilitating identification of a path by the aggregate computational costs involved in reaching finMS node along the path. For example, when defining the path, at any given point two or more operations may be selected to place the computer system in the next desired machine state in the path. The present programming technique may select the operation having the greatest computational cost in the case where this provides a path with an overall aggregate computational cost that is the lowest among all paths available. This is a benefit not typically provided by other processing techniques, some of which are know as greedy techniques, such as List Programming that typically chooses the lower cost operation at each node in a path that may produce a path of operations that has a higher computational cost associated therewith compared to other paths. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
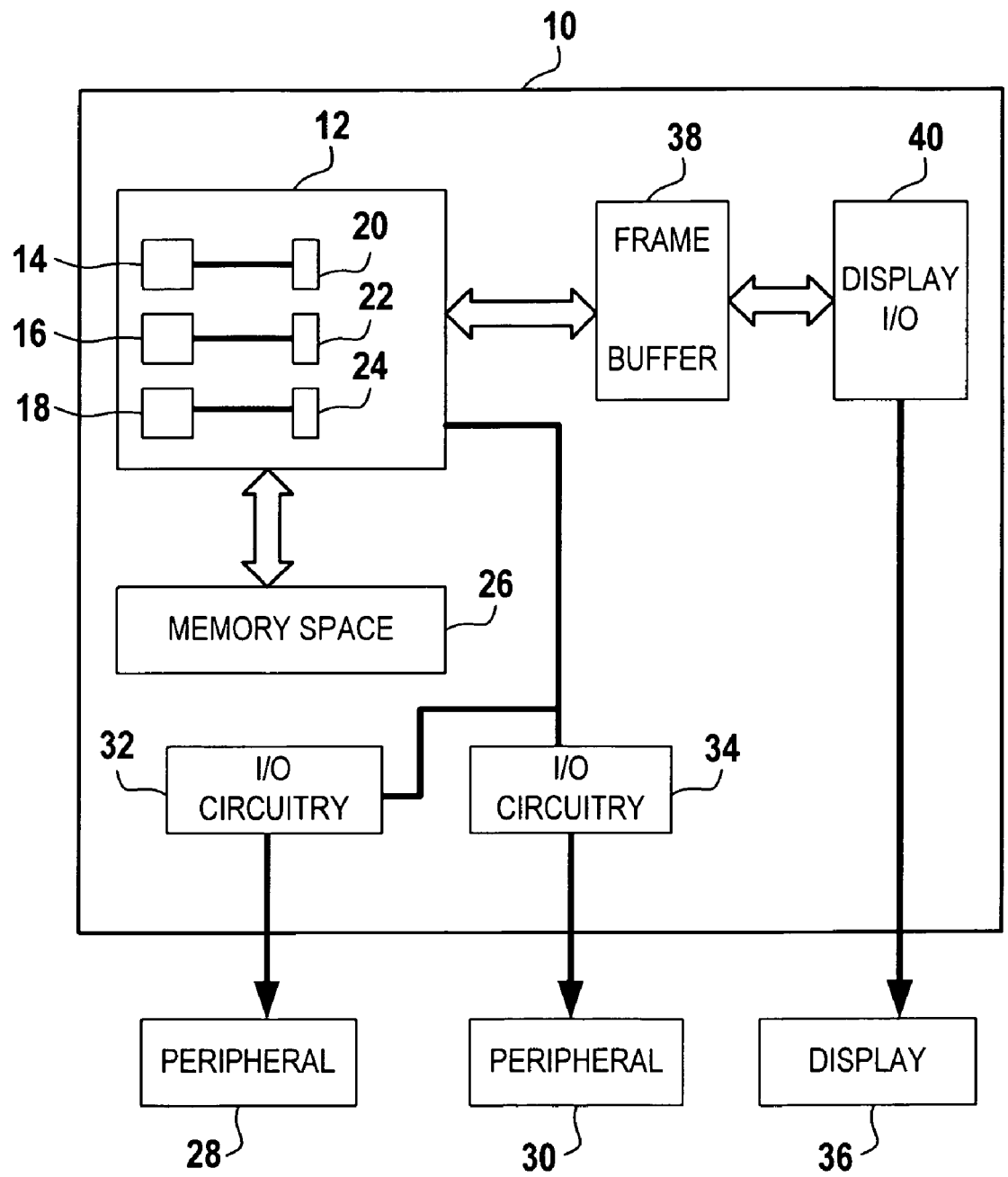
FIG. 1 is a simplified schematic diagram illustrating a computer system incorporating the invention accordance with one embodiment.

FIG. 1 shows a computer system 10 that includes a processing unit 12 that may have one or more processors, three of which are shown as 14, 16, and 18. Each of processors 14, 16 and 18 are in data communication with one or more register banks 20, 22 and 24. Processing unit 12 is in data communication with a memory space 26. Computer system 10 may be in data communication with one or more peripheral devices 28 and 30 through suitable input/output (I/O) circuitry, shown generally as 32 and 34. In a specific example, one of the peripheral devices comprises a display 36 and the suitable I/O circuit includes a frame buffer 38 in data communication with both processing unit 12 and display interface 40. Frame buffer 38 may be used to store pixel data that is to be rendered on display 36 through interface 40. One skilled in the art will appreciate that computer system 10 may represent a game console, such as, but not limited to the PLAYSTATION 3™ console available from the assignee of the present invention.

Figure 2:
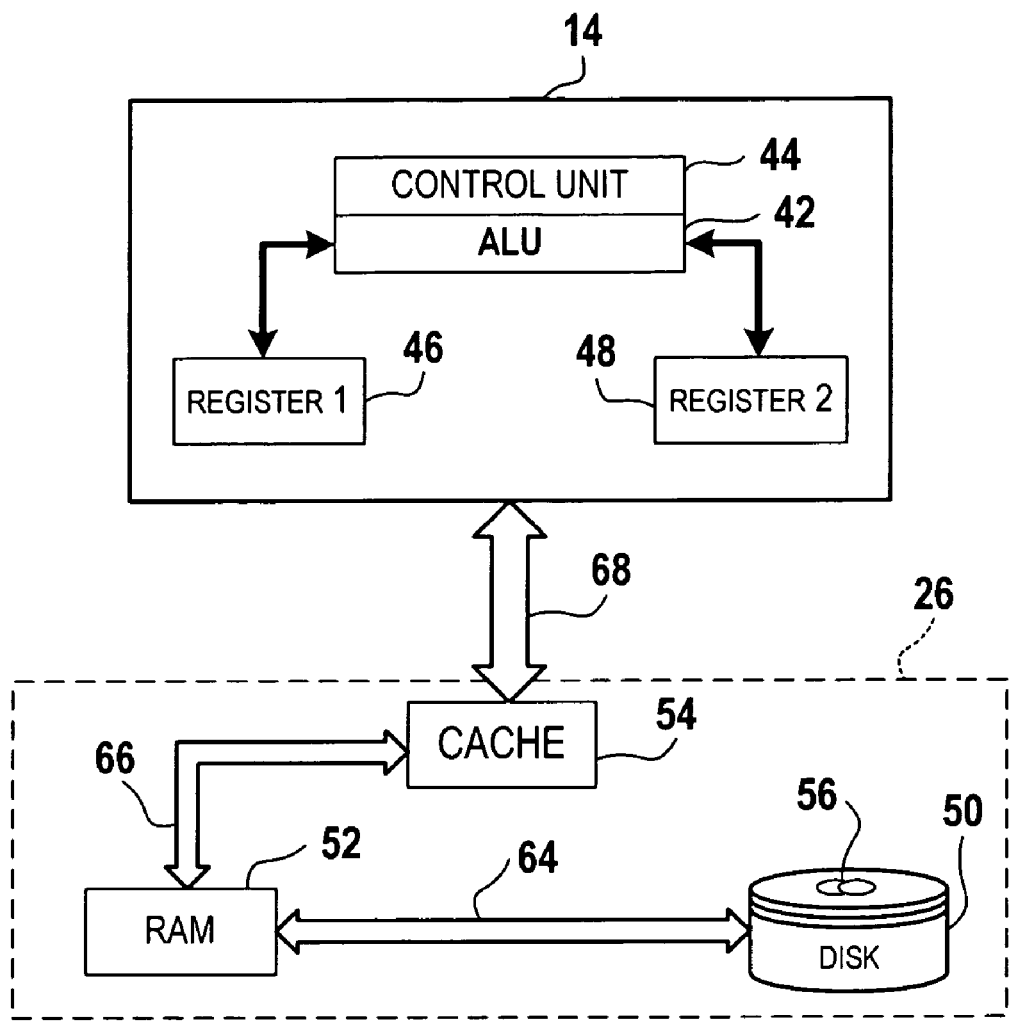
FIG. 2 is a detailed schematic of one of the memory space and one of the processor shown in FIG. 1.

Referring to FIG. 2, the detail of each of processors 14, 16 and 18 is discussed with respect to processor 14. Specifically, processor 14 includes an arithmetic logic unit 42 and a control unit 44 in data communication therewith and register bank 20 includes as registers 46 and 48, in data communication with ALU 52 and control unit 54.

Figure 3:
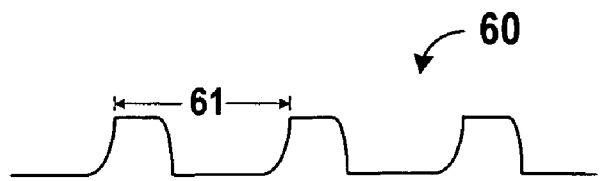
FIG. 3 is a plan view show a clock signal used to regulate the operation of the computer system shown in FIG. 1.

Referring to both FIGS. 1 and 2, memory space 26 includes all memory of computer system 10 outside of the register memory of processor 14, 16 and 18, e.g., register banks 20, 22 and 24. To that end, memory space 26 includes non-volatile memory such as a hard diskette drive 50, and volatile memory, such as random access memory 52 and cache memory 54. HDD 50 is employed to store computer readable media, commonly referred to as computer program 56 that may be operated on by one or more of processors 14, 16 and 18. As is well known in the art, ALU 42 carries out arithmetic and logic operations on the instructions contained in program 56. Control unit 44 is employed to locate, analyze and execute each instruction in program 56. The functioning of computer system 10 is coordinated by a clock signal 60, shown in FIG. 3, with each operation analyzed and executed by control unit 44, shown in FIG. 2, requiring at least at least one clock cycle, shown as 61, in FIG. 3. Furthermore, as is well know in the art, access to memory space 26 by processor 14 requires some of the greatest amount of clock cycles of any one operation. In an attempt to minimize the number of clocks, i.e., reducing the computational cost, required to access memory space 26 differing classes of memories are used having differing access times. Accesses requiring some of the greatest number of clock cycles are read or write operations to HDD 50. This requires moving data to either one or more of RAM 52, cache 54 or registers 46 and 48 that may necessitate transmission of the same over three buses, shown as 64, 66 and 68. The shortest access time is reading and writing data to and from registers 46 and 48, with accessing cache 54 being short than accessing RAM 52. As a result, it becomes clear that the memory resources available substantially influence the computational efficiency of computer system 10. Thus, for a given computer system 10 with a fixed amount of memory resources, the more clock cycles 61 required by program 56, the greater the computational cost, i.e., the greater the demand for computer system resources. The greater the computational cost, the less efficient computer system 10 executes the program. In an extreme case it may not be possible to compile a program for a given computer system, because the resource requirement of the program is too great, which may be considered a fail state of computer system 10. For purposes of the present invention, computational cost may be defined as the resources required of a computer system to process information, with the resources including one or more of memory space, clock cycles and the like, with the clock cycles including those in which computer operations on data are performed (compute cycles) and those in which no computer operations on data are performed (latency cycles). Latency cycles may relate to an overhead associated with, for example, transmitting information across a bus between processors, etc. For more information on processors that may share information between various processors over a bus reference may be made to U.S. patent application Ser. Nos. 11/238,095 entitled CELL PROCESSOR TASK AND DATA MANAGEMENT filed Sep. 27, 2005 and 11/238,087, entitled STU TASK MANAGER FOR CELL PROCESSOR filed Sep. 27, 2005, both of which are incorporated by reference herein.

Figure 4:
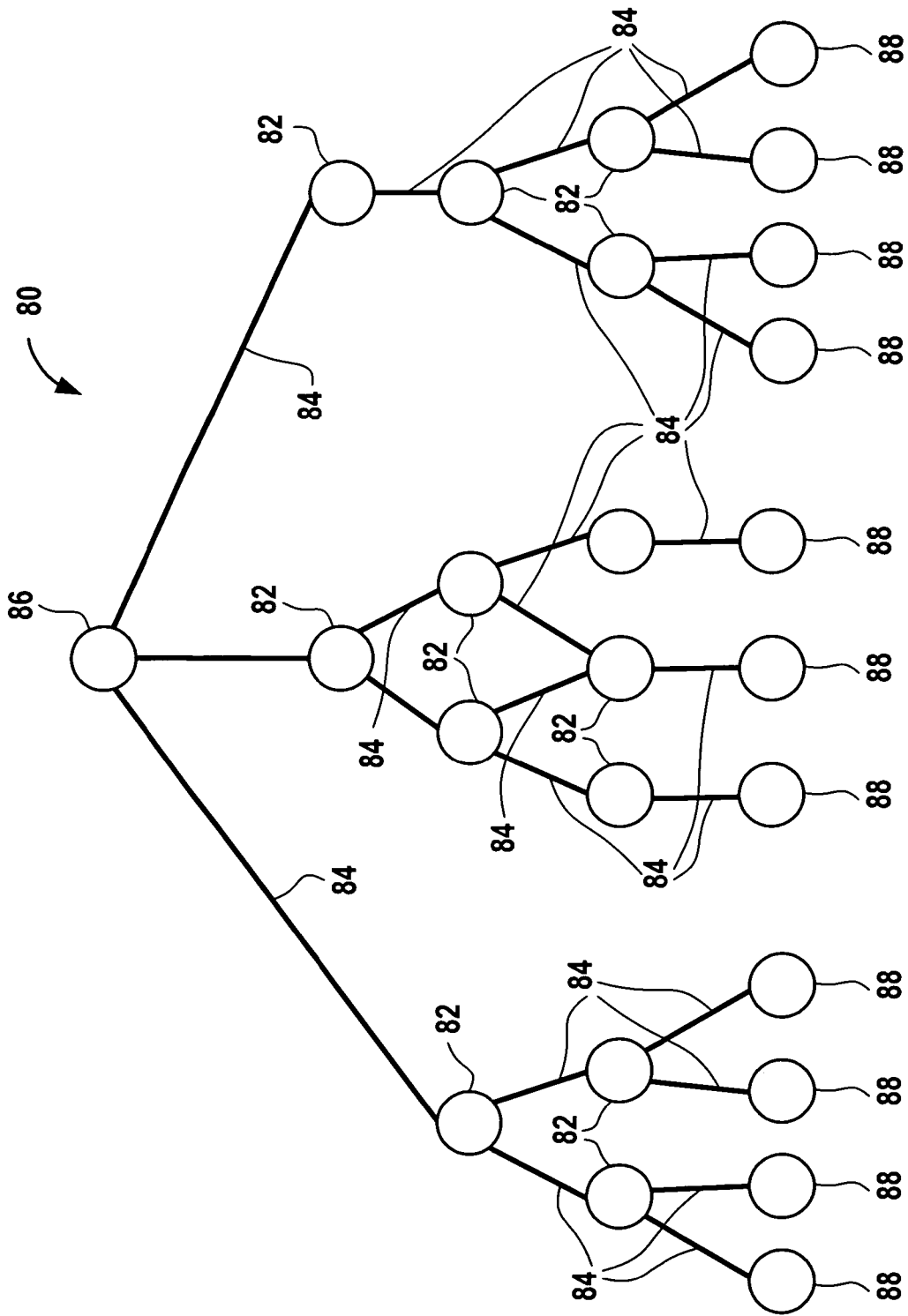
FIG. 4 is a simplified schematic diagram illustrating the operations of the directed acyclic graph in accordance with one embodiment of the invention.

Referring to FIGS. 1, 2 and 4, to carry-out the method one embodiment of the present invention may comprise computer readable code, such as program 56, stored on HDD 50 to generate a directed graph 80 representing a plurality of operations having precedence relations and calling a dynamic programming routine. The dynamic programming routine generates a schedule for executing a subgroup of the plurality of operations to place computer system 10 in a final machine state (finMS), in accordance with the precedence relations, by modeling operation of a computational processor, such as processors 14, 16, and 18, register banks 20, 22 and 24 and more particularly registers 46 and 48, to minimize a computational cost of placing computer system 10 in the finMS. It was recognized that compiling operations of certain programs, e.g., shader programs, may be modeled as a Markovian problem: A problem where a current state is conditionally independent of past states. The dynamic programming routine takes advantage of the attributes of Markovian problems by determining the finMS associated with a root node 86 of graph 80 as a path of operations associated with branch nodes 82. As a result, the dynamic programming routine of program 56 determines, as constrained by the precedence relations of graph 80, the total possible paths to place computer system 10 in the desired final state and the cost associated therewith, in parallel. Following this determination, a desired path is selected by program 56. The path selected defines a schedule for executing operation associated with the nodes of the path, with the schedule being constrained accord to the cost value associated with each of the operations.

Referring to both FIGS. 1 and 4, program 56 may be written employing any suitable language known in the art and computer system 10 may employ any known operating system know in the art such that the plurality of branch nodes 82 of graph 80 are arranged in a plurality of edges 84 coupling branch nodes 82 to a root node 86. In addition to the finMS a final pre-condition machine state (preCMS) and final operation is associated with root node 84. A pre-condition machine state (preCMS) and a post-condition machine state (postCMS) is associated with each of branch nodes 82. For purposes herein, a machine state is defined as a description of the state of the various components of the computer system 10, including the status of the memory space, including availability, the data contain therein and the addresses where the data is located. Also associated with each of branch nodes 82 are one or more of the plurality of operations of program 56. The plurality of edges 84 defines a plurality of paths of branch nodes 82 to place computer system 10 in finMS. Each of the plurality of paths has associated therewith a subgroup of the plurality of operations of the program 56 to be executed to place computer system 10 in the finMS. The path selected is that which provides a desired aggregate computational cost, typically the lowest cost. Specifically, based upon the preCMS and operation associated with each of branch nodes 82, a transitional computational cost is associated therewith to place computer system 10 in the postCMS associated therewith. The sum total of the transition computational costs is referred to as the aggregate computational cost. In the present embodiment, the path selected is that associated with the minimal aggregate computational cost.

Precedence relations of graph 80 define the proper relation of each of branch nodes 82 in a path, i.e., whether an operation associated with a branch node 82 is eligible to be scheduled. To that end, the postCMS of one of branch nodes 82 will match the preCMS of an adjacent branch node 82 that is closer in the path to the root node 86, with the understanding that the postCMS associated with any given branch node 82 is the preCMS associated therewith following application of the operation associated with the same branch node 82. For example, a set of branch nodes 82 are identified having an operation, preCMS and postCMS associated therewith such that execution of the operation places the computer system 10 in the postCMS that equals the preCMS associated with root node 86. Following application of the operation associated with root node 86 the computer system 10 is placed in the finMS.

To generate the schedule of operations having the smallest aggregate computational cost among a plurality of schedules, the dynamic programming routine of program 56 employs a backwards recursive computation to determine the operations of a path to satisfy the finMS associated with root node 86 as constrained by the precedence relations of graph 80. The backwards recursive routine continues until a leaf node 88 is identified: a branch node 82 having a preCMS associated therewith that does not match the postCMS associated with any of the remaining branch nodes 82 and has a postCMS associated therewith that matches a preCMS associated with a branch node 82 in one of the paths disposed between leaf node 88 and root node 86.

One embodiment of the dynamic programming routine is as follows:

```
Cost (node, N) {
    P:={}
    (∀ₙ ∈ N) do
        Sₙ : {valid prior nodes of n with optimal substructure}
    min: = ∞
    (∀ₙ ∈ Sₙ) do
        s.cost:=n.cost + COST(s.operation, s.post-condition)
        if(s.cost <min)
            min:= s.cost
        enddo s
    (∀ₙ ∈ Sₙ such that s.cost = min) do
        P:=(P ∪ s) uniquely by precondition
        enddo s
    enddo n
    if (stage >1)
        return (stage-1,P)
    else
        return min_{p∈P}(p.cost) }
```

The dynamic programming routine of program 56, set forth above, calls stage=n, with n being the number of operations in graph 80 and N being a set of nodes associated with a finMS, with each node of the set N having a unique preCMS associated therewith. The routine initializes an empty set P of branch nodes 82 that represents operations and preCMS and postCMS that will occur immediately preceding one of the nodes associated with set N. This occurs for each element n∈N, which generates a new set of nodes $s_n$ associated with elements n of set N. For every element, s, of set $S_n$ the s.postCMS=n.preCMS. For each element s, of set $S_n$ the cost s.cost is updated to reflect the desired cost, in this example, the minimal cost from s.preCMS to the finMS. The desired cost s.cost is the sum of COST(s.operation, s.postCMS), which is the cost of the operation associate with the node s and t.cost, the best cost among any path to the finMS from n.preCMS, with the understanding that s.postCMS=n.preCMS. The cost is the computational cost in time or computational cycles. In one example the minimal cost would be to traverse a path with the fewest number of branch nodes 82. In another embodiment, Sethi-Ullman number may be employed to derive the desired path. After the cost updates the element s with the desired cost is added to set P. There may be more than one such s for any set $S_n$. However, if there is already an element p of set P, p∈P, then the cost of the two elements are compared and the lowest cost element is retained in set P. The aforementioned functions are repeated for all elements n of set N so that all possible nodes are determined and retain the lowest cost set of paths from the current stage to the end state. The dynamic programming continues recursively until it reaches the initial stage at which time it returns the lower cost among elements of set P. The optimal schedule is the path from the leaf node 88 to the root node 86.

Figure 5A:
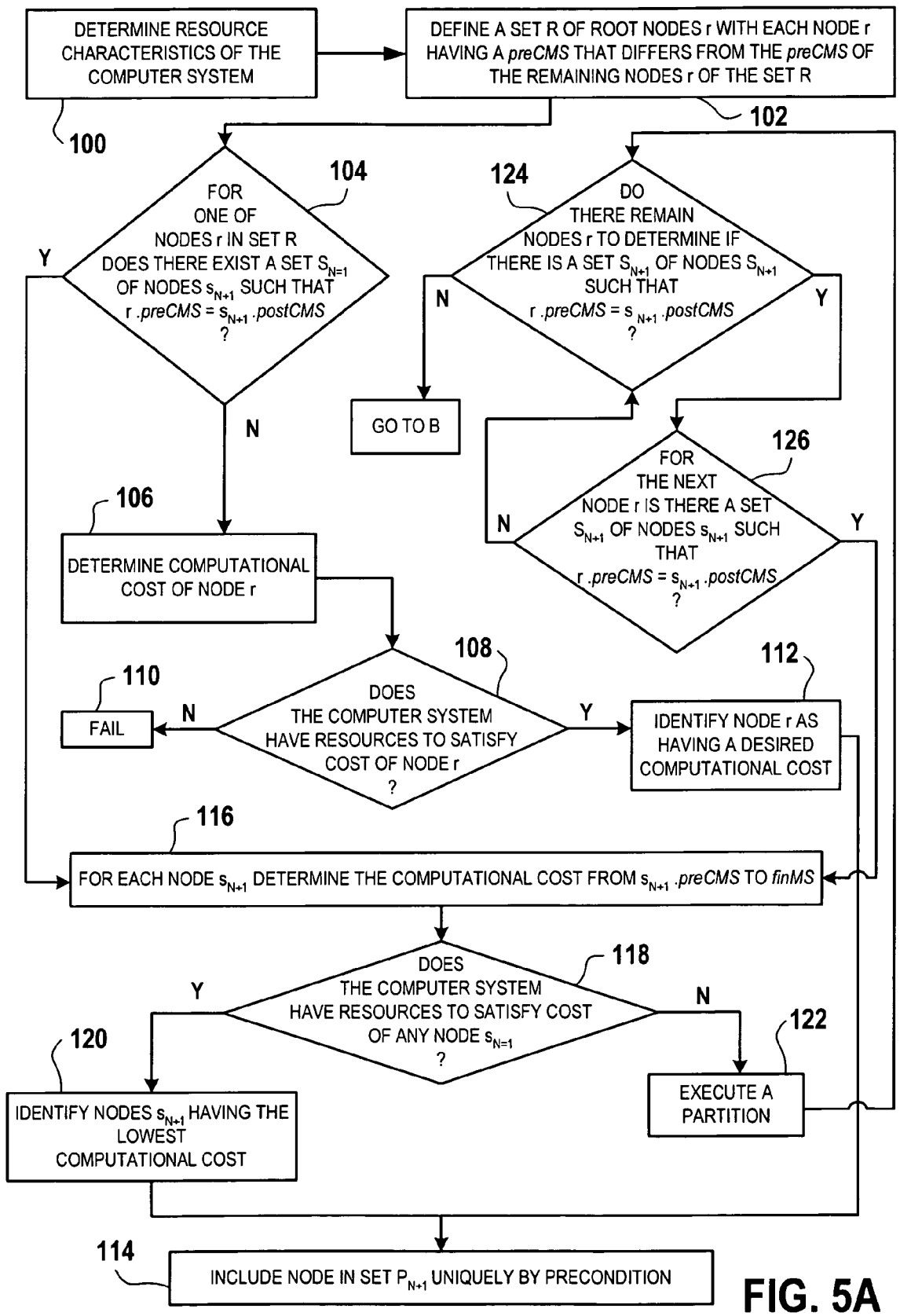
FIGS. 5A and 5B are a flow chart illustrating the method operations for processing a computer program in accordance with one embodiment of the invention.
Figure 5B:
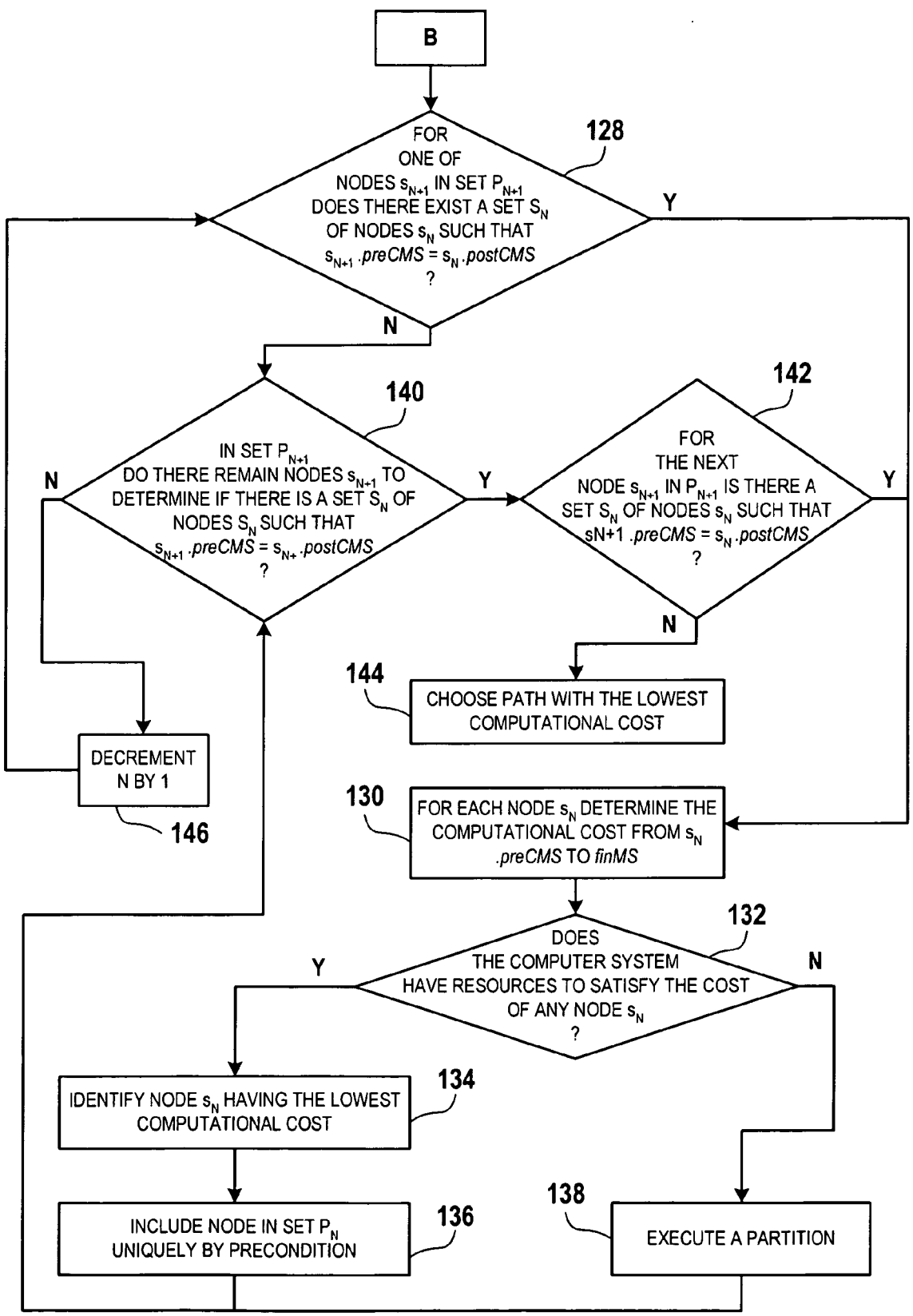

Referring to FIGS. 1, 5A and 5B it becomes manifest that the computational cost generated by the dynamic programming routine is based upon the architecture of computer system 10. An exemplary flow diagram in accordance with another embodiment of the present invention includes a function 100 of program 56 to determining the resources and characteristics of the resources of computer system 10. Information obtained by function 100 would include the complete operating environment of computer system 10 include architecture, e.g., the type of processor, speed of operation, registers available, as well as the size and components included in memory space 26. Additionally, the peripheral devices and any specialty interface sub-systems may be detected and characterized during function 100 and stored in memory space 26. Based upon the characteristic information obtained by function 100 a set R of root nodes r are developed at step 102. Each of the roots of set R having a preCMS associated therewith that differs from the preCMS of the remaining nodes r of set R, a graph 80 is developed by function 72. At function 104, it is determined whether for one of nodes r, there exists a set $S_{N+1}$ of nodes $s_{N+1}$ such that the preCMS associated with node r (r.preCMS) equate to the postCMS associated with node $s_{N+1}$ ($s_{N+1}$.postCM). Were this determined not to be the case, function 106 would occur in which the computational cost of executing the function associated with node r would be determined, followed by function 108 at which point it would be determined whether computer system 10 could satisfy the cost associated with node r, i.e., were the resources available to execute the operation associated with node r. Were it not to be the case, the dynamic programming routine would fail at 110.

Were it determined that computer system 10 had resources available to satisfy the cost associated with node r, node r would be determined as having a desired computational cost at function 112 and included in set $P_{N+1}$ at function 114. Were it determine, at function 104, that there exists a set $S_{N+1}$ of nodes $s_{N+1}$, then function 116 would determine the computational cost of undertaking operations to change the machine state of computer system 10 from preCMS to finMS along multiple paths, with each a path extending from one of nodes $s_{N+1}$ in set $S_{N+1}$ to one of root nodes in set R. Function 118 would determine whether computer system 10 had the resources to satisfy the cost associated with executing operations associated any node $s_{N+1}$ in set $S_{N+1}$. Were it determined that such was the case, at function 120 the nodes $s_{N+1}$ of set $S_{N+1}$ having the lower computational cost associated therewith would be identified and subsequently include in set $P_{N+1}$ uniquely by precondition by function 11, with the precondition being as discussed above. As implied by the last statement, there function 120 may determine that there is more than one such node $s_{N+1}$ for any set $S_{N+1}$ having the lowest cost, e.g., there may be two or more nodes $s_{N+1}$ having the same cost. In this case either of the lower-cost nodes may be selected and the other discarded. However, if there is already one of nodes $S_{N+1}$ that is an element p of set P, p∈P, then the cost of the two elements are compared and the lowest cost element is retained in set P. Were it found that computer system 10 did not possess the resources to satisfy the cost associated with any of nodes $s_{N+1}$ at function 118, then a partition would be executed at function 122. Execution of a partition could be performed by the execution of any number of a myriad of schedule operation with directed to freeing resources of computer system 10 to continue executing program as defined by the schedule of operations requiring minimal computational cost as defined by the dynamic programming routine. For example, information contained in registers 46 and 48 may be stored cache 68, RAM 52 and/or HDD 50 and the addresses of registers 46 and 48 made available for additional data, e.g., cleared of existing data. Thereafter, the last node $s_{N+1}$ in the schedule occurring before function 122 was reached is treated as a root node r and function 124 occurs, e.g., one of nodes $s_{N+1}$ could be considered included in Set R, temporarily.

Function 124 occurs following either function 114 or function 122 to determine whether there remain nodes r to determine whether there exists any additional sets $S_{N+1}$ of nodes $s_{N+1}$ such that r.preCMS=$S_{N+1}$.postCMS. Were this determined to be the case, then for the next root node r, it would be determined whether there exists any addition sets $S_{N+1}$ of nodes $s_{N+1}$ such that r.preCMS=$s_{+1}$.postCMS at function 126, followed by functions 116 and 118 and, as appropriate, either functions 120 and 114 or function 122. Were function 124 to determine that there did not exist any additional sets $S_{N+1}$ of nodes $s_{N+1}$ such that r.preCMS=$s_{+1}$.postCMS, then function 128 determine whether for one of nods $S_{N+1}$ in set $P_{N+1}$ there exists a set $S_N$ of nods $s_N$ such that $s_{N+1}$.preCMS=$s_N$.postCMS. If this were the case, that function 130 would determine the computational cost of undertaking operations to change the machine state of computer system 10 from preCMS to finMS along multiple paths, with each a path extending from one of nodes $s_N$ in set $S_N$ to one of root nodes r in set R. Function 132 would determine whether computer system 10 had the resource to satisfy the cost associated with executing operations associated any node $s_N$ in set $S_N$. Were it determined that such was the case, at function 134 the nodes $s_N$ of set $S_N$ having the lower computational cost associated there with would be identified and subsequently include in set $P_N$ uniquely by precondition by function 11, at function 136, with the precondition being as discussed above. Were it found that computer system 10 did not possess the resources to satisfy the cost associated with any of nodes $s_N$ at function 132, then a partition would be executed at function 138, as discussed above with respect to function 122. As a result, the last node $s_N$ in the schedule occurring before function 138 was reached is treated as a root node $s_{N+1}$ and function 140 occurs, e.g., one of nodes $s_N$ could be considered included in set $S_{N+1}$, temporarily.

Function 140 occurs following either function 136 or function 138 to determine whether there remain nodes $s_{N+1}$ to determine whether there exists any additional sets $S_N$ of nodes $s_N$ such that $s_{N+1}$.preCMS=$s_N$.postCMS. Were this determined to be the case, then for the next node $s_{N+1}$, it would be determined whether there exists any additional sets $S_N$ of nodes $s_N$ such that $s_{N+1}$.preCMS=$s_N$.postCMS at function 142, followed by functions 130 and 132 and, as appropriate, either functions 134 and 136 or function 138. Were function 142 to determine that there did not exist any additional sets $S_N$ of nodes $s_N$ such that $s_{N+1}$.preCMS=$s_N$.postCMS, then the dynamically programming routine would then choose from nodes that form elements $p_N$ of set $P_N$, the path with the least computational cost to place computer system 10 in finMS at function 144 to, in the case of a shader program, render a target pixel on a monitor or other display, such as one associated with a PLAYSTATION 3™ console. Were it found, at function 140, that there did not remain nodes $s_{N+1}$ to determine whether there exists any additional sets $S_N$ of nodes $s_N$ such that $s_{N+1}$.preCMS=$s_N$.postCMS function 146 would decrement N by 1 followed by the execution of function 128. It becomes manifest that the scheduling takes place after all of the paths have been generated and a machine state has been associated with each of the nodes in the paths. As a result, the dynamic programming algorithm facilitates modeling the operations of computer system 10, particularly the register spaced thereof, such as registers 46 and 48 to determine the most computationally efficient path by which to place computer system 10 in finMS.

Figure 6:
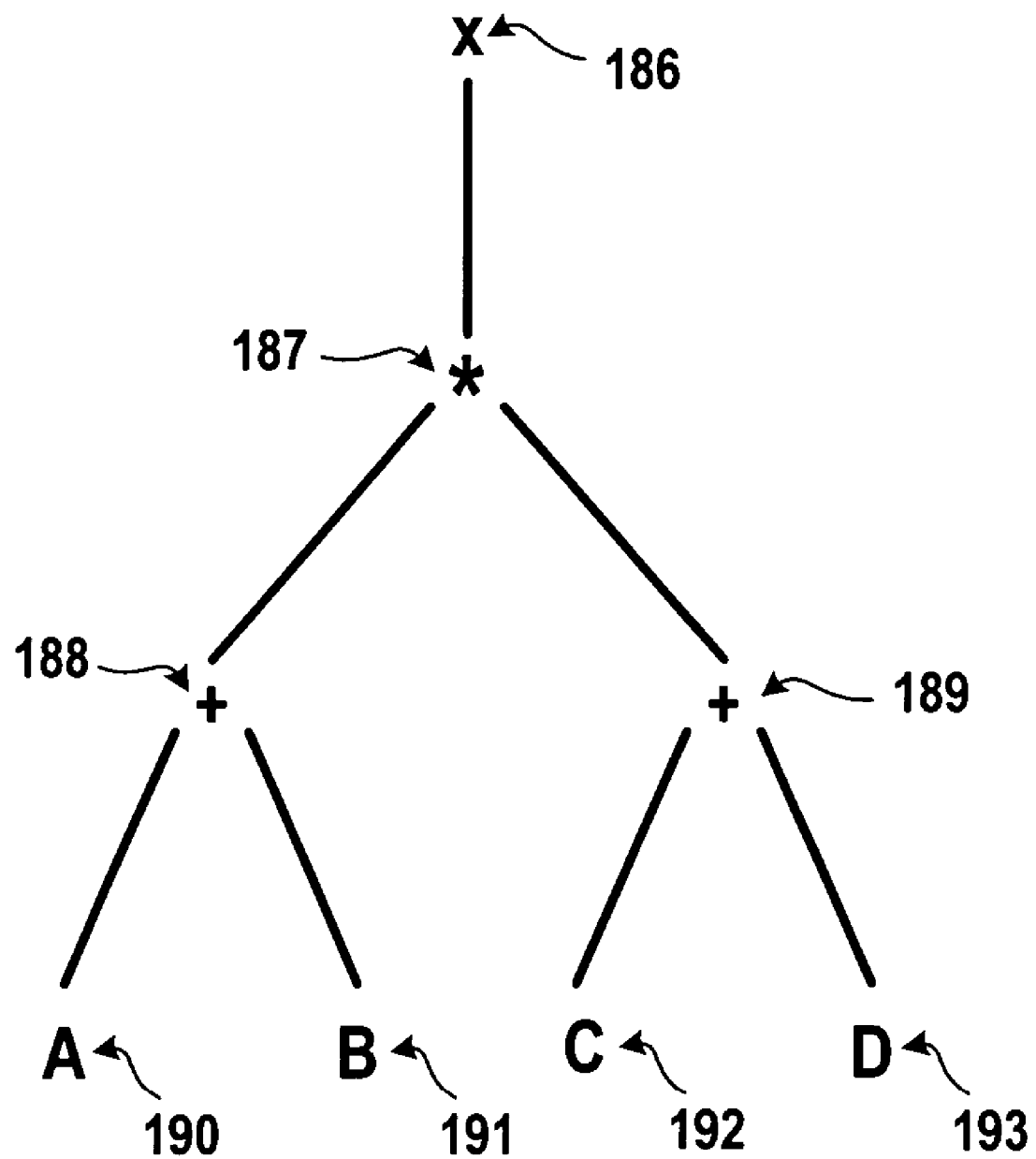
FIG. 6 is a simplified schematic diagram illustrating a directed acyclic graph of a simple Markovian problem in accordance with one embodiment of the invention.

FIG. 6 demonstrates an exemplary DAG 160 where in a root node has associated therewith a final state x=(A+B)*(C+D). DAG 160 shows final state reduced to a plurality of sub-problems, each of which corresponds to a branch node. In this example, there are eight nodes that include root node 186 and seven branch nodes 187, 188, 189, 190, 191, 192, 193. In the present example, the preCMS associated with node 190 would be that one of registers 46 or 48 had memory addresses available, e.g., empty. For purposes of the present example, it is assumed that the preCMS is that register 46 has memory addressed available for data A. The operation associated with node 190 is LOAD A into register 46, with the postCMS being that register 46 includes data A. Similarly, node 191 may be associated with the preCMS that register 48 had memory addresses available for data B. The operation associated with node 191 is LOAD B into register 48, with the postCMS being that register 48 includes data B. The preCMS with node 188 would be that data A is in register 46 and data B is in register 48, with the postCMS being that value A+B. The operation associated with node 192 is LOAD C into register 46, with the postCMS being that register 46 includes data C. Similarly, node 193 may be associated with the preCMS that register 48 had memory addresses available for data D. The operation associated with node 192 is LOAD D into register 48, with the postCMS being that register 48 includes data D. The preCMS with node 189 would be that data C is in register 46 and data D is in register 48, with the postCMS being that value C+D. As can be seen each of the nodes have a preCMS and a postCMS associated therewith, which are as defined above. Exemplary information associated with a node is shown below in TABLE 1 as follows:

TABLE 1

| | |
|---|---|
| postCMS | value of A + B in register 46 |
| operation | sum value A and value B |
| preCMS | data A in register 46 and value B in register 48 |
| cost | x compute cycles |

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network and/or in conjunction parallel processing where there is a multi-core processing environment, multiple processors with multiple arithmetic logic units. In this manner, an additional requirement for preCMS may be directed to synchronizing the operations of the various processors such that data is ready for processing.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing, in a computer system, a computer program having a plurality of operations, said method comprising:
generating a directed graph representing said plurality of operations and having precedence relations associated therewith by a processor of said computer system; and
calling a dynamic programming routine to generate a schedule for executing a subgroup of said plurality of operations to place said computer system in a final machine state (finMS), in accordance with said precedence relations, by modeling operations of a computational processor associated with said computer system to minimize a computational cost of placing said computer system in said finMS,
wherein each of the plurality of operations include an associated computational cost, and the modeling operations of the computational processor include identifying precondition machine states (preCMS) and post condition machine states (postCMS) of said computer system associated with each of the plurality of operations of said subgroup, and
wherein when the computer system does not possess one or more resource to satisfy the associated computational cost for any one of the plurality of operations of said subgroup,
executing a partition to free the one or more resource of the computer system so as to continue executing the subgroup of the plurality of operations that would place said computer system in said finMS to minimize the computational cost.

2. The method of claim 1 wherein calling further includes, ascertaining thereamong, a set of eligible operations, with said set including operations of said subgroup in which said preCMS are satisfied by said computer system being in a desired postCMS due to operations of said subgroup occurring earlier in said schedule than said eligible operations.

3. The method of claim 1 wherein calling further includes, ascertaining thereamong, a set of eligible operations, with said set including operations of said subgroup in which said preCMS are satisfied by said computer system being in a desired postCMS due to operations of said subgroup occurring earlier in said schedule than said eligible operations and including in said subgroup one of the operations of said set having a computational cost that is greater than the computational cost of one of the remaining operations of said set.

4. The method of claim 1 wherein calling further includes developing a graph having a plurality of branch nodes arranged in a plurality of branches extending from a root node, having said finMS related thereto, with each of said branch nodes being affiliated with one of said plurality of operations, and including in said subgroup operations affiliated with one of said plurality of branches having a minimum number of branch nodes.

5. The method of claim 1 wherein calling further includes developing a plurality of paths in which the plurality of operations of said subgroup are located and selecting a path from said plurality of paths, defining a selected path, and applying a partition to define one or more passes required to execute the operation located in said selected path to render a pixel.

6. The method of claim 1 wherein said computational cost represents a time value associated with accessing the resource of said computer system to execute one of the plurality of operations of said subgroup.

7. The method as recited in claim 1 wherein calling further includes generating a plurality of paths, with one of said plurality of operations being associated with multiple paths, each of said multiple paths including a remaining operation of said plurality of operations, with said one of said plurality of operations having a pre-condition associated therewith that may be satisfied by each of the remaining operations associated with the multiple paths, and selecting said one of the remaining operations having a greatest computational cost among said remaining operations.

8. The method of claim 1 wherein said computational cost is a function of altering said computer system from said preCMS to said postCMS.

9. The method of claim 8 wherein each of said preCMS and said postCMS further include information concerning resources of said computer system available for execution of one of the operations of said subgroup.

10. A method for processing, in a computer system, a computer program having a plurality of operations, said method comprising:
developing a graph having a plurality of branch nodes arranged in a plurality of branches extending from a root node, having a final machine state (finMS) related thereto by a processor of said computer system, with each of said branch nodes being affiliated with one of said plurality of operations and a computational cost for executing said one of said plurality of operations; and
identifying a plurality of branch sets, each of which defines a path in which a subgroup of said plurality of operations are to be executed to obtain said finMS and has related thereto an aggregate computational cost, defining a plurality of aggregate computational costs, wherein the identifying of the plurality of branch sets includes identifying pre-condition machine states (preCMS) and post condition machine states (postCMS) of said computer system associated with each of the plurality of branch nodes in each of said plurality of branch sets, and wherein when the computer system does not possess one or more resources to satisfy said computational cost for any one of the plurality of operations of said subgroup.

executing a partition to free one or more resources of the computer system so as to continue executing the subgroup of the plurality of operations that would place said computer system in said finMS with minimal aggregate computational cost.

11. The method as recited in claim 10 further including executing one of said plurality of branches having a least aggregate computational cost of said plurality of aggregate computational costs.

12. The method as recited in claim 10 wherein said computational cost is defined by information concerning the preCMS and the postCMS of said computer system with said information including resources of said computer system available for execution of said one of said number of operations and a time required to execute said one of said plurality of operations.

13. The method as recited in claim 10 wherein developing further includes generating a plurality of paths, with one of said plurality of operations associated with multiple paths, each of which includes a remaining operation of said plurality of operations, with said one of said plurality of operations having a precondition associated therewith that may be satisfied by each of the remaining operations associated with the multiple paths, and selecting said one of the remaining operations having a greatest computational cost among said remaining operations.

14. The method as recited in claim 10 wherein developing further includes parsing said plurality of operations into a directed acyclic graph and identifying a set of root nodes, including said root node, with each of the root nodes of said set having said finMS associated therewith, with the finMS of one of the root nodes of said set differing from the finMS of the remaining root nodes of said set.

15. The method as recited in claim 10 wherein developing further includes generating a directed graph from said plurality of operations and identifying a set of root nodes, including said root node, with each of the root nodes of said set having said finMS associated therewith, with the finMS of one of the root nodes of said set differing from the finMS of the remaining root nodes of said set and developing said directed graph for each of said plurality of root nodes.

16. A method for processing, in a computer system, a computer program having a plurality of operations, said method comprising:

generating a directed graph from said plurality of operations having precedence conditions associated therewith by a processor of said computing system;

identifying a set of root nodes each of which defines a final machine state (finMS) of said computer system, with the finMS of one of the root nodes of said set differing from the finMS of the remaining root nodes of said set;

for each of the root nodes of said set, developing a plurality of branch nodes arranged in a plurality of branches extending therefrom, with each of said plurality of branch nodes being affiliated with one of said plurality of operations and a computational cost for executing said one of said plurality of operations; and identifying a plurality of branch sets, each of which defines a path in which a subgroup of said plurality of operations are to be executed to obtain said finMS and has related thereto an aggregate computational cost, defining a plurality of aggregate computational costs, wherein the identifying of the plurality of branch sets includes identifying pre-condition machine states (preCMS) and post condition machine states (postCMS) of said computer system associated with each of the plurality of branch nodes in each of said plurality of branch sets, and wherein when the computer system does not possess one or more resources to satisfy said computational cost for any one of the plurality of operations of said subgroup, executing a partition to free one or more resources of the computer system so as to continue executing the subgroup of the plurality of operations that would place said computer system in said finMS with minimal aggregate computational cost.

17. The method as recited in claim 16 further including executing said path having least aggregate computational cost of said plurality of aggregate computational costs.

18. The method as recited in claim 16 wherein said computational cost is defined by information concerning said preCMS and said postCMS of said computer system with said information including resources of said computer system available for execution of said one of said plurality of operations and a time required to execute said one of said plurality of operations.

19. The method as recited in claim 16 wherein developing further includes developing a plurality of paths, with one of said plurality of operations associated with multiple paths, each of which includes a remaining operation of said plurality of operations, with said one of said plurality of operations having a preCMS associated therewith that may be satisfied by each of the remaining operations associated with the multiple paths, and selecting said one of the remaining operations having a greatest computational cost among said remaining operations.

20. The method of claim 16 wherein each of said plurality of branch nodes operations has a preCMS and a postCMS associated therewith, with said computational cost defined by resources of said computer system required to alter said computer system from said preCMS to said postCMS by said one of said plurality of operations.

* * * * *